US012755421B2

(12) United States Patent
Park et al.

(10) Patent No.: US 12,755,421 B2
(45) Date of Patent: Oct. 6, 2026

(54) MULTI-PERSON 3D POSE ESTIMATION

(71) Applicants: Denso International America, Inc., Southfield, MI (US); DENSO CORPORATION, Kariya (JP); Carnegie Mellon University, Pittsburgh, PA (US)

(72) Inventors: Jinhyung Park, Pittsburgh, PA (US); Yu-Jhe Li, Pittsburgh, PA (US); Rawal Khirodkar, Pittsburgh, PA (US); Kris Kitani, Pittsburgh, PA (US); Shawn Hunt, Bethel Park, PA (US)

(73) Assignees: DENSO INTERNATIONAL AMERICA INC., Southfield, MI (US); DENSO CORPORATION, Kariya (JP); CARNEGIE MELLON UNIVERSITY, Pittsburgh, PA (US)

( * ) Notice: Subject to any disclaimer, the term of this patent is extended or adjusted under 35 U.S.C. 154(b) by 337 days.

(21) Appl. No.: 18/504,429

(22) Filed: Nov. 8, 2023

(65) Prior Publication Data

US 2025/0069256 A1 Feb. 27, 2025

Related U.S. Application Data

(60) Provisional application No. 63/534,020, filed on Aug. 22, 2023.

(51) Int. Cl.
*G06T 7/73* (2017.01)

(52) U.S. Cl.
CPC .................................... *G06T 7/73* (2017.01)

(58) Field of Classification Search
CPC ............ G06T 7/73; G06T 2207/20084; G06T 2207/30196; G06T 2207/30232; G06T 2207/30244; G06T 7/75
See application file for complete search history.

(56) References Cited

U.S. PATENT DOCUMENTS 11,380,121 B2 7/2022 Kojima
11,521,373 B1 12/2022 Akbas et al.
(Continued)

FOREIGN PATENT DOCUMENTS

WO WO-2021216948 A1 * 10/2021 .......... G06V 40/103
WO WO-2022197367 A1 * 9/2022
WO WO-2025054192 A1 * 3/2025 ............ G06N 3/045

OTHER PUBLICATIONS

Cong, Peishan, et al. "Weakly supervised 3d multi-person pose estimation for large-scale scenes based on monocular camera and single lidar." Proceedings of the AAAI Conference on Artificial Intelligence. vol. 37. No. 1. 2023.*
(Continued)

*Primary Examiner* — Shefali D Goradia
(74) *Attorney, Agent, or Firm* — Christopher G. Darrow; Darrow Mustafa PC

(57) ABSTRACT

Systems, methods, and other embodiments described herein relate improve the estimation of poses within an environment including multiple people and uncalibrated cameras. In one embodiment, a method includes acquiring sensor data including images with depth information of a surrounding environment that includes multiple people. The method includes determining 2D poses and 3D features for the people according to the sensor data. The method includes generating camera poses using at least the depth information and the features for cameras that generated the images. The method includes generating 3D poses for the people according to the camera poses and the 3D features. The method includes providing the 3D poses of the people.

18 Claims, 6 Drawing Sheets

(56) References Cited

U.S. PATENT DOCUMENTS

| | | | | |
|---|---|---|---|---|
| 11,763,477 | B2 * | 9/2023 | Veiga | G06T 7/73<br>382/103 |
| 2005/0190972 | A1 * | 9/2005 | Thomas | H04N 5/2224<br>382/218 |
| 2011/0063403 | A1 * | 3/2011 | Zhang | G06V 40/167<br>348/E7.083 |
| 2021/0248772 | A1 | 8/2021 | Iqbal et al. | |
| 2021/0281814 | A1 * | 9/2021 | Guizilini | H04N 13/271 |
| 2022/0066544 | A1 * | 3/2022 | Kwon | G06T 7/251 |
| 2022/0148453 | A1 | 5/2022 | Lin et al. | |

OTHER PUBLICATIONS

Nister, "An Efficient Solution to the Five-Point Relative Pose Problem", IEEE transactions on pattern analysis and machine intelligence, 2004, 17 pages.
Olson, "AprilTag: A robust and flexible visual fiducial system", 2011 IEEE international conference on robotics and automation, 2011, 8 pages.
Ono, et al., "LF-Net: Learning Local Features from Images", Advances in neural information processing systems, 2018, 11 pages.
Pavlakos, et al., "Ordinal Depth Supervision for 3D Human Pose Estimation", Proceedings of the IEEE Conference on Computer Vision and Pattern Recognition, 2018, 10 pages.
Pavlakos, et al., "Coarse-to-Fine Volumetric Prediction for Single-Image 3D Human Pose", Proceedings of the IEEE conference on computer vision and pattern recognition, 2017, 10 pages.
Reddy, et al., "TesseTrack: End-to-End Learnable Multi-Person Articulated 3D Pose Tracking", Proceedings of the IEEE/CVF Conference on Computer Vision and Pattern Recognition, 2021, 10 pages.
Redmon, et al., "YOLOv3: An Incremental Improvement", arXiv preprint arXiv:1804.02767, 2018, 6 pages.
Rogez, et al., "LCR-Net: Localization-Classification-Regression for Human Pose", Proceedings of the IEEE Conference on Computer Vision and Pattern Recognition, 2017, 9 pages.
Rogez, et al., "LCR-Net++: Multi-person 2D and 3D Pose Detection in Natural Images", IEEE transactions on pattern analysis and machine intelligence, 2019, 15 pages.
Rosten, et al., "Machine learning for high-speed corner detection", European conference on computer vision, 2006, 14 pages.
Rublee, et al., "ORB: an efficient alternative to SIFT or SURF", 2011 International conference on computer vision, 2011, 8 pages.
Shavit, et al., "Introduction to Camera Pose Estimation with Deep Learning", arXiv preprint arXiv:1907.05272, 2019, 14 pages.
Shen, et al., "Deep Group-shuffling Random Walk for Person Re-identification", Proceedings of the IEEE Conference on Computer Vision and Pattern Recognition, 2018, 10 pages.
Si, et al., "Dual Attention Matching Network for Context-Aware Feature Sequence based Person Re-Identification", Proceedings of the IEEE Conference on Computer Vision and Pattern Recognition, 2018, 10 pages.
Song, et al., "Mask-guided Contrastive Attention Model for Person Re-Identification", Proceedings of the IEEE Conference on Computer Vision and Pattern Recognition, 2018, 10 pages.
Su, et al., "Pose-driven Deep Convolutional Model for Person Re-identification", Proceedings of the IEEE Conference on Computer Vision and Pattern Recognition, 2017, 10 pages.
Sun, et al., "Deep High-Resolution Representation Learning for Human Pose Estimation", Proceedings of the IEEE/CVF Conference on Computer Vision and Pattern Recognition, 2019, 11 pages.
Sun, et al., "Beyond Part Models: Person Retrieval with Refined Part Pooling (and A Strong Convolutional Baseline)", Proceedings of the European Conference on Computer Vision, 2018, 17 pages.
Triggs, et al., "Bundle Adjustment—A Modern Synthesis", International workshop on vision algorithms, 1999, 72 pages.
Tu, et al., "VoxelPose: Towards Multi-Camera 3D Human Pose Estimation in Wild Environment", European Conference on Computer Vision, 2020, 17 pages.
Vaswani, et al., "Attention Is All You Need", arXiv preprint arXiv:1706.03762, 2017, 11 pages.
Wang, et al., "Resource Aware Person Re-identification across Multiple Resolutions", Proceedings of the IEEE Conference on Computer Vision and Pattern Recognition, 2018, 10 pages.
Wei, et al., "Person Transfer GAN to Bridge Domain Gap for Person Re-Identification", Proceedings of the IEEE Conference on Computer Vision and Pattern Recognition, 2018, 10 pages.
Wei, et al., "GLAD: Global-Local-Alignment Descriptor for Pedestrian Retrieval", Proceedings of the ACM Conference on Multimedia, 2017, 9 pages.
Wu, et al., "Graph-Based 3D Multi-Person Pose Estimation Using Multi-View Images", Proceedings of the IEEE/CVF International Conference on Computer Vision, 2021, 10 pages.
Yang, et al., "UR2KiD: Unifying Retrieval, Keypoint Detection, and Keypoint Description without Local Correspondence Supervision", arXiv preprint arXiv:2001.07252, 2020, 12 pages.
Yao, et al., "Deep Representation Learning with Part Loss for Person Re-Identification", IEEE Transactions on Image Processing, 2019, 10 pages.
Yi, et al., "LIFT: Learned Invariant Feature Transform", European Conference on Computer Vision, 2016, 16 pages.
Zanfir, et al., "Monocular 3D Pose and Shape Estimation of Multiple People in Natural Scenes", Proceedings of the IEEE Conference on Computer Vision and Pattern Recognition, 2018, 10 pages.
Zanfir, et al., "Deep Network for the Integrated 3D Sensing of Multiple People in Natural Images", Advances in Neural Information Processing Systems, 2018, 10 pages.
Wang, et al., "Direct Multi-view Multi-person 3D Pose Estimation", Advances in Neural Information Processing Systems, 2021, 12 pages.
Zhao, et al., "Spindle Net: Person Re-identification with Human Body Region Guided Feature Decomposition and Fusion", Proceedings of the IEEE Conference on Computer Vision and Pattern Recognition, 2017, 9 pages.
Zhao, et al., "Deeply-Learned Part-Aligned Representations for Person Re-Identification", Proceedings of the IEEE Conference on Computer Vision and Pattern Recognition, 2017, 10 pages.
Zheng, et al., "Pose Invariant Embedding for Deep Person Re-identification", arXiv preprint, 2017, 10 pages.
Balntas, et al., "RelocNet: Continuous Metric Learning Relocalisationusing Neural Nets," Proceedings of the European Conference on Computer Vision (ECCV), 2018, pp. 751-767.
Belagiannis, et al., "3D Pictorial Structures Revisited: Multiple Human Pose Estimation", IEEE transactions on pattern analysis and machine intelligence, 2015, 14 pages.
Belagiannis, et al., "Multiple Human Pose Estimation with Temporally Consistent 3D Pictorial Structures", European Conference on Computer Vision, 2014, 12 pages.
Benhibi, et al., "ELF: Embedded Localisation of Features in Pre-Trained CNN", Proceedings of the IEEE International Conference on Computer Vision, 2019, 10 pages.
Benzine, et al. "PandaNet : Anchor-Based Single-Shot Multi-Person 3D Pose Estimation", Proceedings of the IEEE/CVF Conference on Computer Vision and Pattern Recognition, 2020, 10 pages.
Burenius, et al., "3D Pictorial Structures for Multiple View Articulated Pose Estimation", Proceedings of the IEEE conference on computer vision and pattern recognition, 8 pages.
Calonder, et al., "BRIEF: Binary Robust Independent Elementary Features", European conference on computer vision, 2010, 14 pages.
Cao, et al., "Realtime Multi-Person 2D Pose Estimation using Part Affinity Fields", Proceedings of the IEEE conference on computer vision and pattern recognition, 2017, 9 pages.
Chang, et al., "Multi-Level Factorisation Net for Person Re-Identification", Proceedings of the IEEE Conference on Computer Vision and Pattern Recognition, 2018, 10 pages.
Chen, et al. "3D Human Pose Estimation = 2D Pose Estimation + Matching", Proceedings of the IEEE Conference on Computer Vision and Pattern Recognition, 2017, 9 pages.
Chen, et al., "Group Consistent Similarity Learning via Deep CRF for Person Re-Identification", Proceedings of the IEEE Conference on Computer Vision and Pattern Recognition, 2018, 10 pages.

(56) References Cited

OTHER PUBLICATIONS

Cheng, et al., "HigherHRNet: Scale-Aware Representation Learning for Bottom-Up Human Pose Estimation", Proceedings of the IEEE/CVF conference on computer vision and pattern recognition, 2020, 10 pages.
Cheng, et al., "Person Re-Identification by Multi-Channel Parts-Based CNN with Improved Triplet Loss Function", Proceedings of the IEEE Conference on Computer Vision and Pattern Recognition, 2016, 10 pages.
Chetverikov, et al., "The Trimmed Iterative Closest Point Algorithm", 2002 International Conference on Pattern Recognition, 2002, 4 pages.
Detone, et al., "SuperPoint: Self-Supervised Interest Point Detection and Description", Proceedings of the IEEE Conference on Computer Vision and Pattern Recognition Workshops, 2018, 13 pages.
Ding, et al., "CamNet: Coarse-to-Fine Retrieval for Camera Re-Localization", Proceedings of the IEEE International Conference on Computer Vision, 2019, 10 pages.
Dong, et al., "Fast and Robust Multi-Person 3D Pose Estimation from Multiple Views", Proceedings of the IEEE/CVF Conference on Computer Vision and Pattern Recognition, 10 pages.
Dusmanu, et al., "D2-Net: A Trainable CNN for Joint Description and Detection of Local Features", Proceedings of the IEEE Conference on Computer Vision and Pattern Recognition, 2019, 10 pages.
Ershadi-Nasab, et al., "Multiple human 3d pose estimation from multiview images", Multimedia Tools and Applications, 2018, pp. 15573-15601.
Fabbri, et al., "Compressed Volumetric Heatmaps for Multi-Person 3D Pose Estimation", Proceedings of the IEEE/CVF Conference on Computer Vision and Pattern Recognition, 2020, 10 pages.
Georgiev, et al., "A Practical Method for Decomposition of the Essential Matrix", Applied mathematical sciences, 2014, 17 pages.
Goodfellow, et al., "Generative Adversarial Networks", Advances in Neural Information Processing Systems, 2014, 6 pages.
Gu, et al., "Recent Advances in Convolutional Neural Networks", Pattern Recognition, 2018, 38 pages.
Harris, et al., "A Combined Corner and Edge Detector", Alvey vision conference, 1988, 6 pages.
Hartley, et al., "Multiple View Geometry in Computer Vision", 2003, 48 pages.
Hartley, "In Defense of the Eight-Point Algorithm", IEEE Transactions on pattern analysis and machine intelligence, 1997, 14 pages.
Hartley, et al., "Triangulation", Computer vision and image understanding, 1997, 13 pages.
Jakubovic, et al., "Image Feature Matching and Object Detection using Brute-Force Matchers", 2018 International Symposium ELMAR, 5 pages.
Kalayeh, et al., Human Semantic Parsing for Person Re-identification, Proceedings of the IEEE Conference on Computer Vision and Pattern Recognition, 2018, 10 pages.
Kendall, et al., "PoseNet: A Convolutional Network for Real-Time 6-DOF Camera Relocalization", Proceedings of the IEEE international conference on computer vision, 2015, 9 pages.
Kipf, et al., "Semi-Supervised Classification With Graph Convolutional Networks", arXiv preprint arXiv:1609.02907, 2016, 14 pages.
Laskar, et al., "Camera Relocalization by Computing Pairwise Relative Poses Using Convolutional Neural Network", Proceedings of the IEEE International Conference on Computer Vision Workshops, 2017, 10 pages.
Li, et al., "Generating Multiple Hypotheses for 3D Human Pose Estimation with Mixture Density Network", Proceedings of the IEEE/CVF Conference on Computer Vision and Pattern Recognition, 2019, 9 pages.
Li, et al., "Learning Deep Context-aware Features over Body and Latent Parts for Person Re-identification", Proceedings of the IEEE Conference on Computer Vision and Pattern Recognition, 2017, 10 pages.
Li, et al., "Five-Point Motion Estimation Made Easy", 18th International Conference on Pattern Recognition, 2006, 4 pages.
Li, et al., "Maximum-Margin Structured Learning with Deep Networks for 3D Human Pose Estimation", Proceedings of the IEEE international conference on computer vision, 2015, 9 pages.
Li, et al., "Rethinking on Multi-Stage Networks for Human Pose Estimation", arXiv preprint arXiv:1901.00148, 2019, 10 pages.
Li, et al., "Harmonious Attention Network for Person Re-Identification", Proceedings of the IEEE Conference on Computer Vision and Pattern Recognition, 2018, 10 pages.
Li, et al., "Recover and Identify: A Generative Dual Model for Cross-Resolution Person Re-Identification", Proceedings of the IEEE International Conference on Computer Vision, 2019, 10 pages.
Lin, et al., "Improving Person Re-identification by Attribute and Identity Learning", arXiv preprint, 2017, 12 pages.
Liu, et al., "Pose Transferrable Person Re-Identification", Proceedings of the IEEE Conference on Computer Vision and Pattern Recognition, 2018, 10 pages.
Lowe, David G., "Distinctive Image Features from Scale-Invariant Keypoints", International journal of computer vision, 2004, 28 pages.
Martinez, et al., "A simple yet effective baseline for 3d human pose estimation", Proceedings of the IEEE international conference on computer vision, 2017, 10 pages.
Mehta, et al., "XNect: Real-time Multi-person 3D Human Pose Estimation with a Single RGB Camera", Acm Transactions on Graphics, 2020, 18 pages.
Mehta, et al., "Single-Shot Multi-Person 3D Pose Estimation From Monocular RGB", 2018 International Conference on 3D Vision, 2018, 16 pages.
Melekhov, et al., "Relative Camera Pose Estimation Using Convolutional Neural Networks", International Conference on Advanced Concepts for Intelligent Vision Systems, 2017, 12 pages.
Moon, et al., "Camera Distance-aware Top-down Approach for 3D Multi-person Pose Estimation from a Single RGB Image", Proceedings of the ieee/cvf international conference on computer vision, 2019, 10 pages.
Moon, Todd K., "The Expectation-Maximization (EM) Algorithm", IEEE Signal processing magazine, 1996, 20 pages.
Muja, et al., "FLANN—Fast Library for Approximate Nearest Neighbors User Manual", Computer Science Department, University of British Columbia, 2009, 21 pages.
Nie, et al., "Single-Stage Multi-Person Pose Machines", Proceedings of the IEEE/CVF international conference on computer vision, 2019, 10 pages.
Xu et al., "Multi-View Multi-Person 3D Pose Estimation with Uncalibrated Camera Networks", The 33rd British Machine Vision Conference (BMVC) 2022, London, UK, Nov. 21-24, 2022, 15 pages.
Xu et al., "Wide-Baseline Multi-Camera Calibration using Person Re-Identification", Apr. 17, 2021, 10 pages, arXiv:2104.08568v1.
Zheng et al., "Parameter-Efficient Person Re-identification in the 3D Space", Journal of Latex Class Files, Aug. 2015, 12 pages, vol. 14, No. 8.

* cited by examiner

MULTI-PERSON 3D POSE ESTIMATION

CROSS-REFERENCE TO RELATED APPLICATION

This application claims the benefit of U.S. Provisional Patent Application No. 63/534,020, filed Aug. 22, 2023, which is incorporated by reference herein in its entirety.

TECHNICAL FIELD

The subject matter described herein relates in general to systems and methods for improving pose estimation and, more particularly, to using depth data to improve the estimation of poses within an environment including multiple people and uncalibrated cameras.

BACKGROUND

Various devices that provide information about a surrounding environment often use sensors that facilitate perceiving obstacles and additional aspects of the surrounding environment. As one example, a device uses information from the sensors to develop awareness of the surrounding environment in order to identify and avoid hazards when navigating the environment and/or to predict motion of agents (e.g., people) within the environment. In particular, the device uses the perceived information to determine a structure of the environment and characteristics of the agents so that the device may distinguish between different regions and identify potential hazards. The ability to perceive accurate information about the environment and derive useful information therefrom can be a complex task.

For example, within an environment that includes multiple people, accurately determining a pose of each individual person can be difficult. That is, the pose of the person generally includes a particular orientation and location of that person. Using images to derive the pose can encounter problems with occlusions between multiple people (e.g., part of one person blocking another), and so on. In particular, accurately assigning keypoint detections between different people can be complex, especially in circumstances where the sensor data includes images from separate uncalibrated cameras. As a result, inaccuracies can persist within the pose determinations leading to reduced confidence in available knowledge. Consequently, difficulties persist with accurately representing 3D poses in a multi-person environment with uncalibrated cameras.

SUMMARY

Example systems and methods associated with improving 3D pose estimation of persons within a multi-person context with uncalibrated cameras are disclosed. As previously noted, determining 3D poses in a multi-person context using images from uncalibrated cameras can represent many difficulties. For example, accurately associating points with the appropriate person and determining a pose for the cameras can suffer from various issues that may ultimately degrade the quality of determinations.

Therefore, in one embodiment, a disclosed approach involves using explicit depth information to improve the determination of 3D poses. In one approach, an inventive system initially acquires RGB (red, green, blue) images from multiple cameras within an environment of the same scene. The scene can include a multiplicity of different people, and the cameras are generally situated at different points-of-view (POVs). The cameras themselves may be statically mounted on infrastructure, mounted on moving objects (e.g., vehicles), and so on. Thus, explicit calibrated relationships between the cameras is generally unknown. Moreover, as described herein, in order to improve the determination of 3D pose, the images are generally accompanied, in some form, by depth data. The depth data may be from a LiDAR device, a stereo camera, software derived from images, etc., but includes a correspondence with the image data.

Accordingly, the system uses the images and the depth data by initially detecting people present within the images and determining 2D poses for the people. Thereafter, the system performs cross-view matching with 3D feature clustering by using a model that accepts the 2D poses along with the depth data and extracts 3D features for each person depicted therein. The system can then cluster the 3D features into groups to provide correspondence with the separate people. The system then estimates the camera poses for the cameras that generated the input images. In particular, the system leverages the depth data to constrain the optimization that produces the camera poses. The camera poses are generated as an essential matrix defining a rigid transformation between the cameras that uses the depth information to provide 3D correspondences between points from the separate POVs. Using the 3D extracted features and the cameras poses, the system then determines the 3D poses according to, for example, a triangulation of each pair of 2D point correspondences. In this way, the system provides an improved approach to deriving 3D poses in a multi-person context with uncalibrated cameras.

In one embodiment, a pose system is disclosed. The pose system includes one or more processors and a memory that is communicably coupled to the one or more processors. The memory stores instructions that, when executed by the one or more processors, cause the one or more processors to acquire sensor data, including images with depth information of a surrounding environment that includes multiple people. The instructions include instructions to determine 2D poses and 3D features for the people according to the sensor data. The instructions include instructions to generate camera poses using at least the depth information and the features for cameras that generated the images. The instructions include instructions to generate 3D poses for the people according to the camera poses and the 3D features. The instructions include instructions to provide the 3D poses of the people.

In one embodiment, a non-transitory computer-readable medium is disclosed. The computer-readable medium stores instructions that, when executed by one or more processors, cause the one or more processors to perform the disclosed functions. The instructions include instructions to acquire sensor data, including images with depth information of a surrounding environment that includes multiple people. The instructions include instructions to determine 2D poses and 3D features for the people according to the sensor data. The instructions include instructions to generate camera poses using at least the depth information and the features for cameras that generated the images. The instructions include instructions to generate 3D poses for the people according to the camera poses and the 3D features. The instructions include instructions to provide the 3D poses of the people.

In one embodiment, a method is disclosed. The method includes acquiring sensor data, including images with depth information of a surrounding environment that includes multiple people. The method includes determining 2D poses and 3D features for the people according to the sensor data.

The method includes generating camera poses using at least the depth information and the features for cameras that generated the images. The method includes generating 3D poses for the people according to the camera poses and the 3D features. The method includes providing the 3D poses of the people.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving 3D pose estimation within a multi-person context with uncalibrated cameras are disclosed. As previously noted, determining 3D poses in a multi-person context from uncalibrated cameras can involve many difficulties. Accurately associating points with the appropriate person and determining a pose for the cameras can suffer from various issues that may ultimately degrade the quality of determinations.

Therefore, in one embodiment, a disclosed approach uses depth information to improve the determination of 3D poses. For example, an inventive system initially acquires RGB (red, green, blue) images from multiple cameras within an environment of the same scene. The cameras themselves may be statically mounted on infrastructure, mounted on moving objects (e.g., vehicles), and so on. Moreover, in order to improve the determination of 3D poses, the images are generally accompanied, in some form, by depth data. The depth data may be from a LiDAR device, an infrared (IR) camera, a radar, a stereo camera, software derived from images, etc., but includes a correspondence with the image data. The imaged scene can include a multiplicity of different people, and the cameras are generally situated at different points-of-view (POVs). Thus, explicit calibrated relationships between the cameras are generally unknown.

Accordingly, the system uses the images and the depth data to generate the 3D poses. The system may begin by detecting people present within the images and determining 2D poses for the people. Thereafter, the system performs cross-view matching with 3D feature clustering by using a model that accepts the 2D poses along with the depth data and extracts 3D features for each person depicted therein. The system can then cluster the 3D features into groups to provide correspondence with the separate people. The system then estimates the camera poses for the cameras that generated the input images. In particular, the system leverages the depth data to constrain the optimization that produces the camera poses. The camera poses are generated as an essential matrix defining a rigid transformation between the cameras that uses the depth information to provide 3D correspondences between points from the separate POVs. Using the 3D extracted features and the cameras poses, the system then determines the 3D poses according to, for example, a triangulation of each pair of 2D point correspondences, which may be constrained according to human body priors (e.g., constant bone length, symmetry, etc.) and the depth information. In this way, the system provides an improved approach to deriving 3D poses in a multi-person context with uncalibrated cameras.

Figure 1:
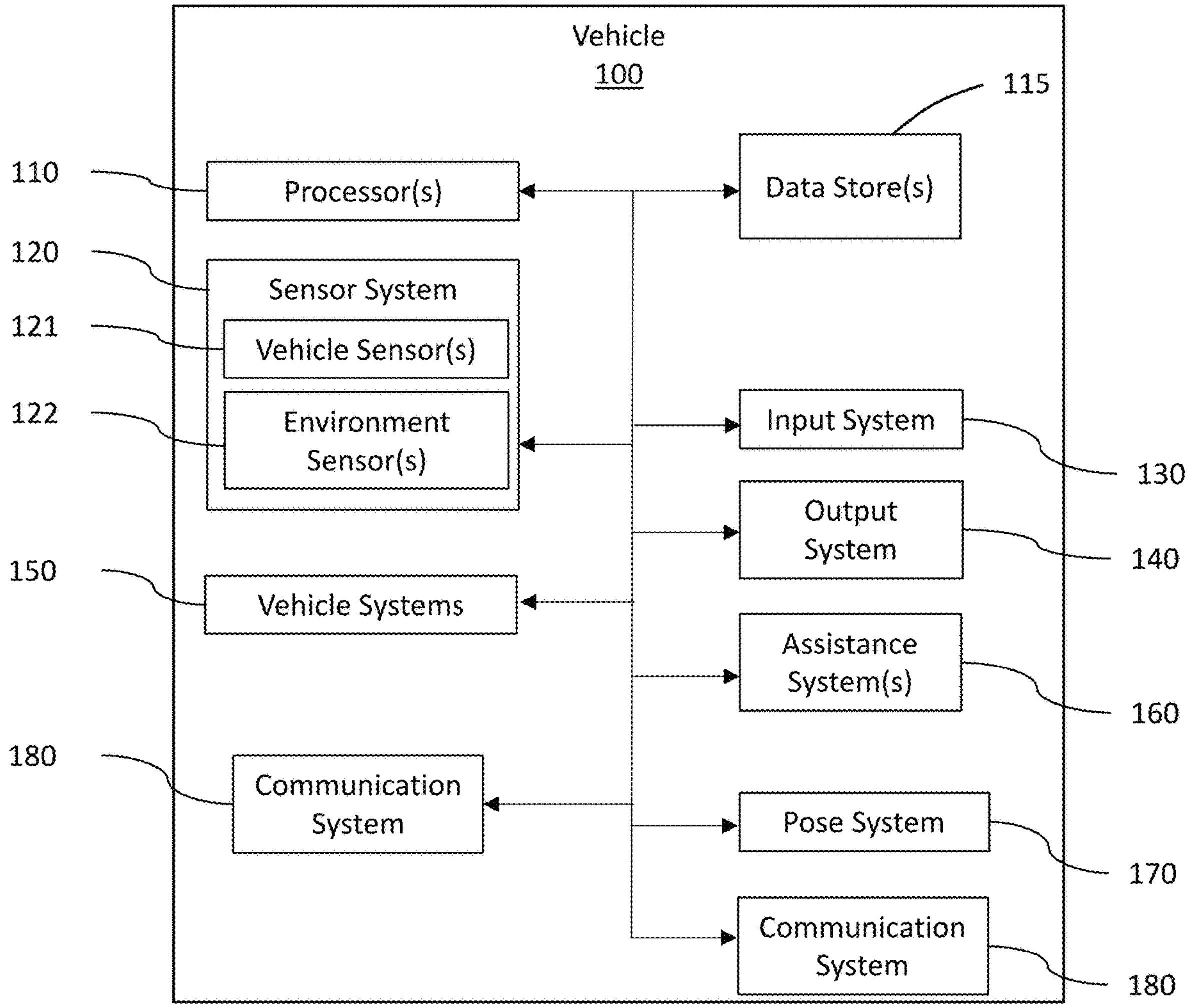
FIG. 1 illustrates one embodiment of a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that benefits from the functionality discussed herein. In still further aspects, instead of a vehicle, the disclosed systems and methods may be implemented in a device, such as infrastructure (e.g., a roadside unit (RSU)), an aerial device (e.g., a drone), a mobile phone, and so on. Accordingly, the vehicle 100 is shown and described as including the pose system 170 for purposes of the present discussion; however, in further aspects, the pose system 170 may be implemented within other devices. Moreover, while the vehicle 100 or another individual device is generally described as performing the noted functions, it should be appreciated that one or more of the functions may be implemented in a cloud-based environment, where, for example, the pose system 170 is implemented as a service that accepts and fulfills requests from various entities.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a pose system 170 that functions to improve the derivation of depth maps by using a machine learning model to process images and depth data together. Moreover, while depicted as a standalone component, in one or more embodiments, the pose system 170 is integrated with the assistance system 160 or another similar system of the vehicle 100 to facilitate functions of the other systems/modules. The noted functions and methods will become more apparent with a further discussion of the figures.

Furthermore, the assistance system 160 may take many different forms but generally provides some form of automated assistance to an operator of the vehicle 100. For example, the assistance system 160 may include various advanced driving assistance system (ADAS) functions, such as a lane-keeping function, adaptive cruise control, collision avoidance, emergency braking, and so on. In further aspects, the assistance system 160 may be a semi-autonomous or fully autonomous system that can partially or fully control the vehicle 100. Accordingly, the assistance system 160, in whichever form, functions in cooperation with sensors of the sensor system 120 to acquire observations about the surrounding environment from which additional determinations can be derived in order to provide the various functions. It should be noted that the sensor system 120 may acquire various portions of sensor data from different sensors, including multiple different cameras and/or depth sensors of the vehicle 100 and from other devices in the environment.

As a further aspect, the vehicle 100 also includes a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via short-range communications, such as a Bluetooth, Wi-Fi, or another suitable protocol for communicating between the vehicle 100 and other nearby devices (e.g., other vehicles, infrastructure elements, etc.). Moreover, the communication system 180, in one arrangement, further communicates according to a long-range protocol, such as the global system for mobile communication (GSM), Enhanced Data Rates for GSM Evolution (EDGE), or another communication technology that provides for the vehicle 100 communicating with a cloud-based resource. In either case, the system 170 can leverage various wireless communications technologies to facilitate communications with nearby vehicles (e.g., vehicle-to-vehicle (V2V)), nearby infrastructure elements (e.g., vehicle-to-infrastructure (V2I), vehicle-to-anything (V2X), etc.), and so on. For example, in one or more arrangements, the pose system 170 may acquire sensor data (e.g., images and depth information) from nearby or remote entities.

Figure 2:
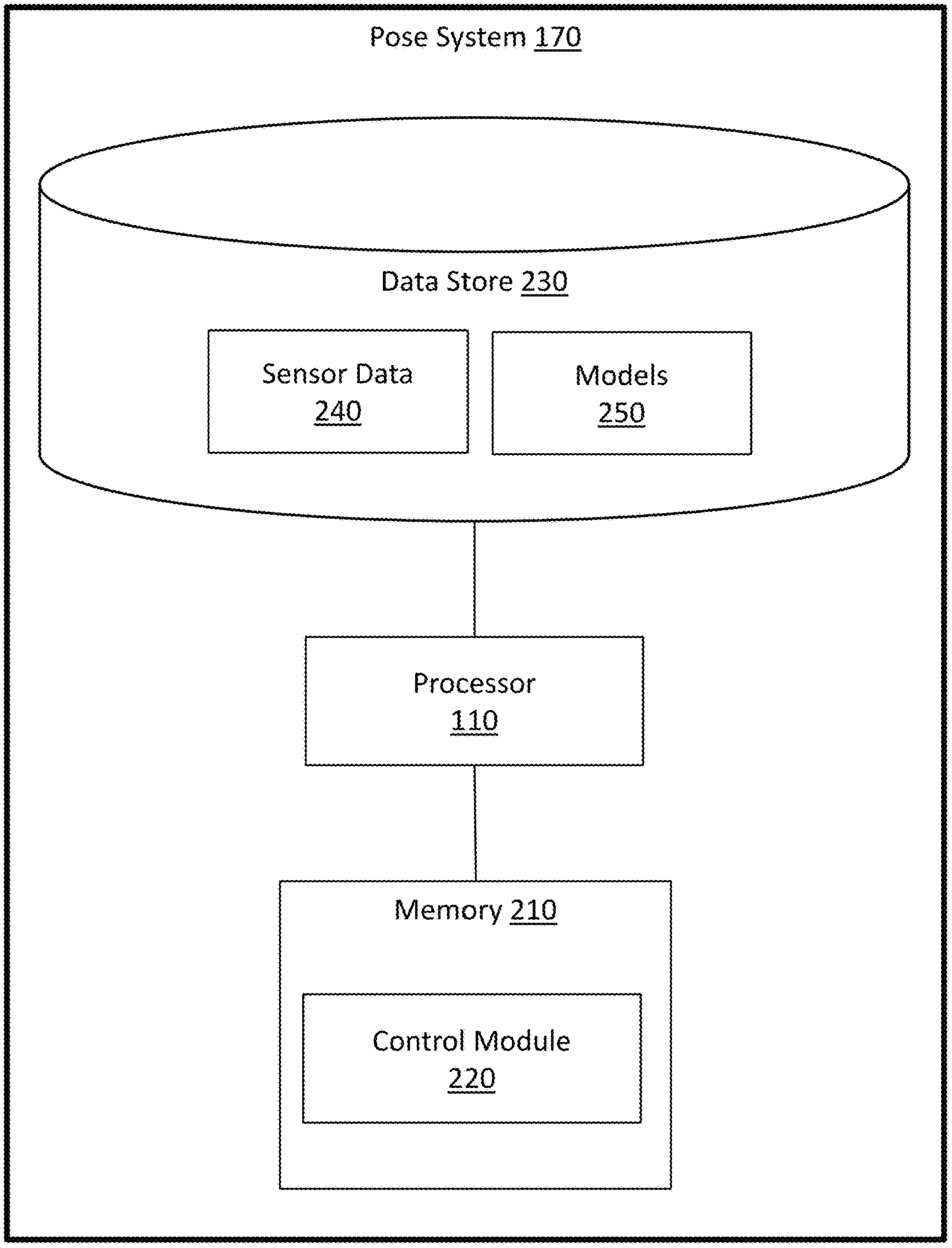
FIG. 2 illustrates one embodiment of a pose system that is associated with improving the determination of poses within a multi-person context with uncalibrated cameras.

With reference to FIG. 2, one embodiment of the pose system 170 is further illustrated. As shown, the pose system 170 includes a processor 110. Accordingly, the processor 110 may be a part of the pose system 170, or the pose system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor, that is capable of performing various functions as described herein when executing encoded functions associated with the pose system 170.

In one embodiment, the pose system 170 includes a memory 210 that stores the control module 220. The memory 210 is a random-access memory (RAM), read-only memory (ROM), a hard disk drive, a flash memory, or other suitable memory for storing the module 220. The module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions.

Furthermore, in one embodiment, the pose system 170 includes a data store 230. The data store 230 is, in one arrangement, an electronically-based data structure for storing information. For example, in one approach, the data store 230 is a database that is stored in the memory 210 or another suitable medium, and that is configured with routines that can be executed by the processor 110 for analyzing stored data, providing stored data, organizing stored data, and so on. In any case, in one embodiment, the data store 230 stores data used by the module 220 in executing various functions. In one embodiment, the data store 230 includes sensor data 240, and models 250 along with, for example, other information that is used by the control module 220.

Accordingly, the control module 220 generally includes instructions that function to control the processor 110 to acquire data inputs from one or more sensors of the vehicle 100 and/or of other devices that form the sensor data 240. In general, the sensor data 240 includes information that embodies observations of the surrounding environment of the vehicle 100 or another device in which the pose system 170 or a client thereof is situated. The observations of the surrounding environment, in various embodiments, can include surrounding scenes that may be a roadway/driving environment or another area that includes multiple different people. Broadly, the sensor data 240 includes images in the form of RGB images from multiple different cameras that are uncalibrated and depth information corresponding with the images. Accordingly, the images may be referred to as RGB-D images since the depth data correlates with the images.

While the control module 220 is discussed as controlling the various sensors to provide the sensor data 240, in one or more embodiments, the control module 220 can employ other techniques to acquire the sensor data 240 that are either active or passive. For example, the control module 220 may passively sniff the sensor data 240 from a stream of electronic information provided by the various sensors to further components within the vehicle 100, acquire the sensor data 240 or at least a portion thereof via a wireless communication link, etc. Moreover, the control module 220 can undertake various approaches to fuse data from multiple sensors when providing the sensor data 240. Thus, the sensor data 240, in one embodiment, represents a combination of perceptions acquired from multiple sensors. That is, the sensor data 240 may include information acquired via the communication system 180, such as data from other vehicles and/or infrastructure devices. The pose system 170 may acquire images and depth data from other vehicles, mobile devices, roadside units, etc.

In any case, the control module 220 acquires the sensor data 240 that includes at least images from, for example, the camera 126 or another imaging device. The images are generally RGB images with corresponding depth information that is either from a separate modality (e.g., LiDAR, IR camera, radar, stereo camera, etc.) or derived from processing the image via, for example, monocular depth estimation. As described herein, the images are, for example, images from the camera 126 or another imaging device that encompasses a field-of-view (FOV) about the vehicle 100 of at least a portion of the surrounding environment. That is, an image is, in one approach, generally limited to a subregion of the surrounding environment. As such, the image may be of a forward-facing (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images without a specific depth modality. Overall, the separate images processed for an iteration of the described approach include overlapping views of the same scene such that people depicted therein are shown in multiple images.

An individual image itself includes visual data of the FOV that is encoded according to an imaging standard (e.g., codec) associated with the camera 126 or another imaging device that is the source. In general, characteristics of a source camera (e.g., camera 126) define a format of the image. Thus, while the particular characteristics can vary according to different implementations, in general, the image has a defined resolution (i.e., height and width in pixels) and format.

Additionally, the sensor data 240 further includes depth data about a scene depicted by the associated images. The depth data indicates distances from a depth/range sensor that acquired the depth data to features in the surrounding environment. The depth data, in one or more approaches, is of a particular density that is associated with the modality of acquisition. That is, the particular sensor or approach to acquiring the depth data may vary and thereby have varying properties. For example, different LiDAR sensors generally have different numbers of scan lines, which influences the density of depth information within a resulting point cloud. Moreover, other modalities, such as stereo cameras and using a monocular depth estimation network, generally provide dense point clouds that provide pixel-wise depth information. Accordingly, the form of the sensor data 240 can vary depending on the implementation but includes both images and corresponding depth data.

Continuing with the description of elements stored by the pose system 170, the data store 230 includes models 250. The models 250 include multiple separate models used by the control module 220 in performing the disclosed approach. For example, the models 250 include, in at least one approach, an object detection model, a 2D pose estimation model, and a 3D re-identification model. Of course, while three separate models are described, in further approaches, the pose system 170 may implement additional models in place of other defined processes. In any case, the object detection model generally functions to identify people represented within the sensor data 240 by processing at least the images. The result is, in one configuration, a set of bounding boxes where each bounding box defines a 2D space within an image associated with an individual person. The object detection model itself can take various forms, but is, in at least one arrangement, a deep neural network, such as a convolutional neural network.

The 2D pose estimation model, in one arrangement, accepts inputs including the images and the bounding boxes defined by the object detection model. The 2D pose estimation model then processes the inputs to generate keypoint detections for different salient points on a person, such as joints, head, etc. The 2D pose estimation model is, in at least one configuration, a deep neural network, such as a convolutional neural network or another network that processes the noted spatial information that is input. The 3D re-identification model generates 3D features of people depicted within a scene where the input can include the prior determinations along with depth information. The 3D re-identification model is, in at least one arrangement, a deep neural network, such as a graph neural network.

Accordingly, with further reference to FIG. 2, the control module 220 includes instructions that, when executed by the processor 110, cause the processor to generate 3D poses for people in a multi-person environment where the source of images are cameras without calibration with one another. As used herein, uncalibrated generally refers to a condition between two or more cameras where information about a spatial relationship between the cameras is unknown even though the cameras capture images of the same scene. As such, using information from the separate cameras to derive the 3D poses includes additional unknowns that the pose system 170 resolves in the manner disclosed herein. As further explanation, consider the following.

The control module 220 implements a pipeline for uncalibrated human pose estimation. As an overview, the control module 220 performs several different functions in support of the pose estimation, including 2D human pose estimation, point cloud feature extraction, depth-guided camera pose estimation, and depth-constrained triangulation for 3D pose estimation. Accordingly, given multi-view depth data with RGB images, which may also be referred to as RGB-D images, the control module 220 estimates 3D human poses. In particular, the images include V views, which provide RGB images $$X = \{x_v\}_{v=1}^{V},$$

where $x_v \in \mathbb{R}^{H \times W \times 3}$ and depth images $$Z = \{z_i\}_{v=1}^{V},$$

where $z_i \in \mathbb{R}^{H \times W \times 1}$ for each time stamp. Let K be the number of humans in the scene, the control module 220 reconstructs the 3D poses $$\{P_k\}_{k=1}^{K},$$

where $P_k \in \mathbb{R}^{j \times 3}$ and each human has J body keypoints.

Figure 3:
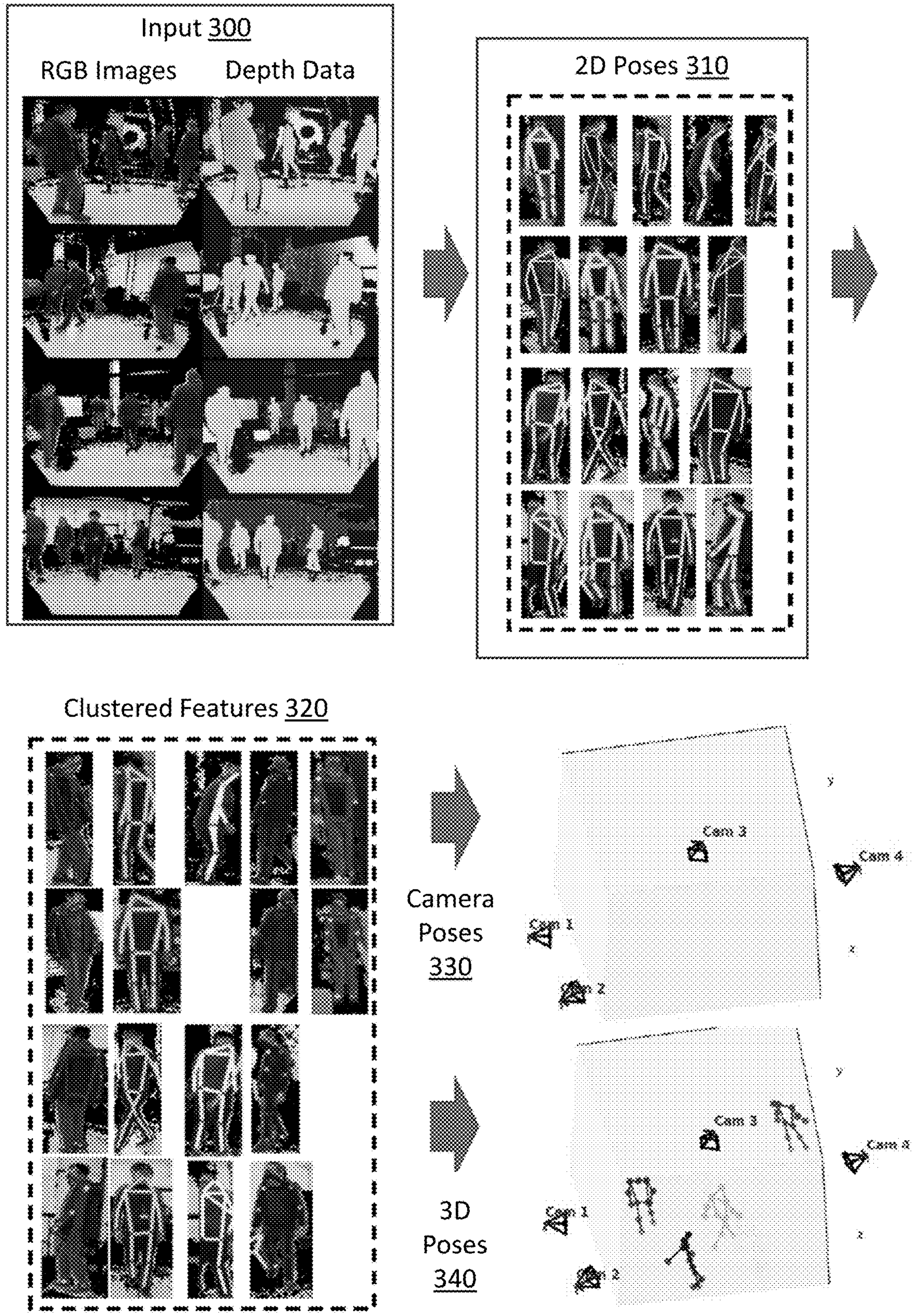
FIG. 3 shows an illustrative example of deriving poses from image and depth inputs.

Initially, the control module determines 2D poses of humans present in the images. Accordingly, the control module 220 applies the object detection model and the 2D pose estimation of the models 250 in order to derive bounding boxes identifying the humans and associated keypoints. In general, the control module 220 processes the sensor data 240 according to the models to generate the bounding boxes and the 2D poses. As shown in FIG. 3, an input 300 includes the RGB images and corresponding depth data that the control module 220 processes into the 2D poses 310.

Note that, as presented in the annotation that follows, each camera may observe $N_v$ humans, where $v \leq V$ is the camera index and $N_v \leq K$. Thus, there are $N_v$ body keypoints $$\{p_{v,n}\}_{v=1,n=1}^{V,N_v},$$

where $p_{v,n} \in \mathbb{R}^{J\times 2}$. Thus, to determine cross-view body keypoint correspondences, the control module 220 extracts features from each detected bounding box. In particular, the control module 220 processes the 2D poses, including the associated RGB image data and the depth data, using the re-identification model. The re-identification model takes the inputs and generates one-dimensional feature vectors. For example, with reference to FIG. 4, the input 400 is shown as including the 2D poses and the depth data that are provided into the 3D re-identification model 410, which outputs a feature vector 420. The feature vectors of the set of images are then processed by the control module 220 according to a clustering approach in order to determine the cross-view correspondence.

The 3D features are denoted as $$\{f_{v,n}\}_{v=1,n=1}^{V,N_v},$$

where $f_{v,n} \in \mathbb{R}^{512}$. The control module 220 clusters the features from all of the views into K groups $$\{C^k \mid C^k \in \mathbb{R}^{512}\}_{k=1}^{K}$$

as follows:

$$\min_{c,w} \sum_{v=1}^{V} \sum_{n=1}^{N_v} \sum_{k=1}^{K} w_{v,n}^k \left(\|f_{v,n} - C^k\|_2^2\right) \quad (1)$$

$$\text{s.t. } \sum_{k=1}^{K} w_{v,n}^k = 1,\ w_{v,n}^k \in \{0, 1\} \quad (2)$$

$$\sum_{v=1}^{V} \sum_{n=1}^{N_v} w_{v,n}^k \le V \quad (3)$$

$$\sum_{n=1}^{N_v} w_{v,n}^k \le 1 \quad (4)$$

Equation (2) illustrates that each feature is only assigned to one cluster. Equation (3) indicates that the number of features within one cluster should be less than V, and Equation (4) illustrates that features within one cluster should not come from the same view. For equations (1)-(4)

$$w_{v,n}^k$$

is the assignment to the identity k. The control module 220 solves the optimization problem using, in one arrangement, an E-M algorithm. For each iteration, the clusters $$\{C^k \mid C^k \in \mathbb{R}^{512}\}_{k=1}^{K}$$

are updated according to Equation (5).

$$C_{t+1}^k = \begin{cases} \dfrac{\sum_{v=1}^{V} \sum_{n=1}^{N_v} w_{v,n}^k \cdot f_{v,n}}{\sum_{v=1}^{V} \sum_{n=1}^{N_v} w_{v,n}^k} & \text{if } \sum_{v=1}^{V} \sum_{n=1}^{N_v} w_{v,n}^k > 0 \\ C_t^k & \end{cases} \quad (5)$$

The body keypoints cross-view correspondence is determined by the control module 220 from each cluster as $$\{p_{v,k}\}_{v=1,k=1}^{V,K},$$

where $p_{v,k} \in \{\mathbb{R}^{J\times 2}, \text{null}\}$ and $p_{v,k}$=null indicates no matched k person in v view. The correspondences can be formulated as the tuple ($p_{i,k}$, $p_{j,k}$) given i≠j, and both keypoints are not from the null space. With renewed reference to FIG. 3, the clustered features 320 are illustrated as one example prior to the control module performing camera pose estimation to derive the camera poses 330 and then estimating the 3D poses 340 via the depth-constrained triangulation.

Figure 5:
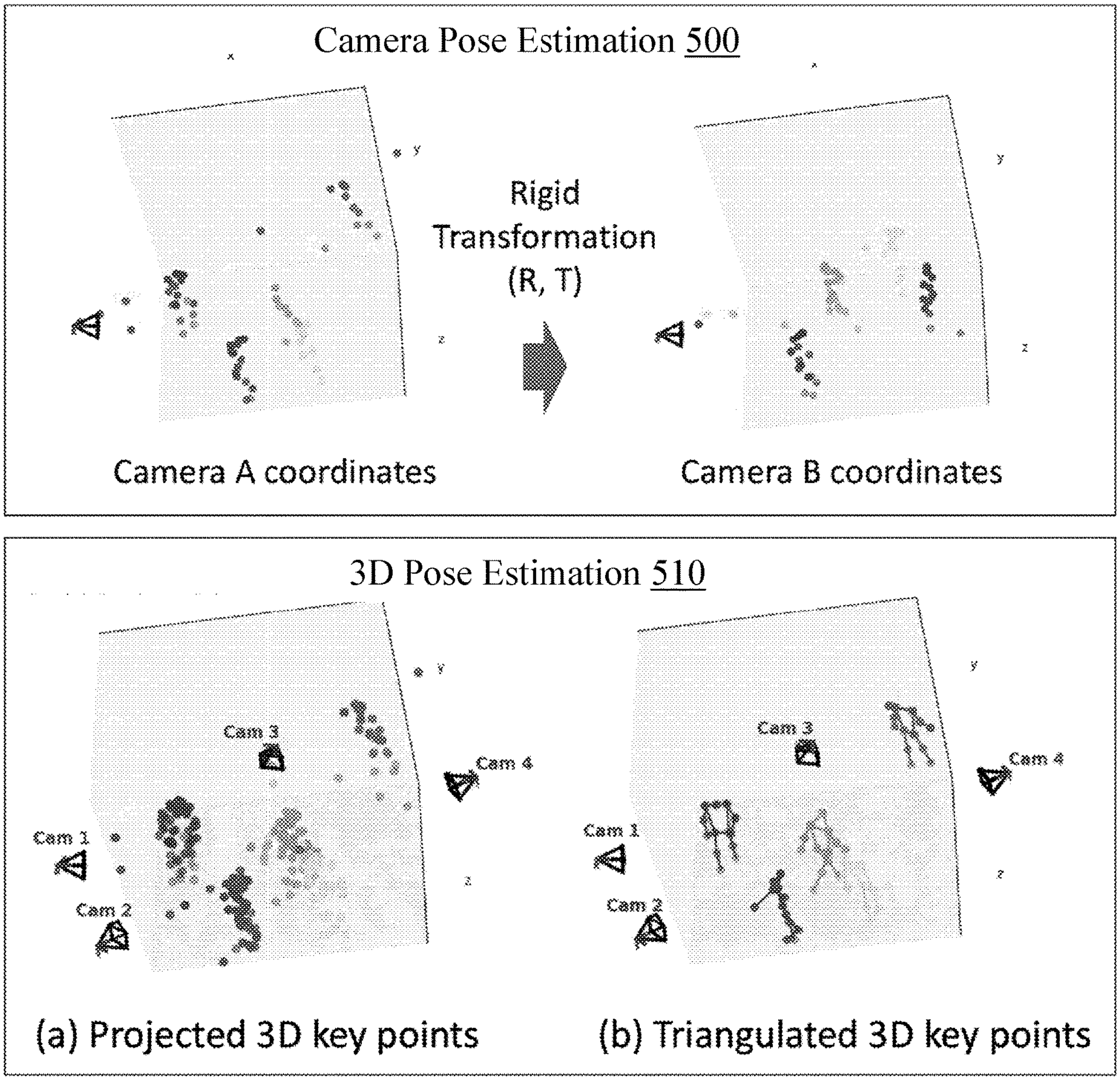
FIG. 5 is a diagram illustrating one embodiment of camera pose estimation and 3D pose estimation.

In any case, the control module 220 performs the camera pose estimation to determine a rigid transformation between the separate cameras. As shown in FIG. 5, the camera pose estimation 500 is between two cameras A and B for which the control module 220 derives a rigid-body transformation (R, T). The rigid-body transformation is generally comprised of a rotation matrix R and an up-to-scale translation t. The transformation can be resolved between two set of 3D points. In one arrangement, the control module 220 implements an eight-point algorithm to produce the essential matrix $E_{AB}$ from camera A to camera B. The essential matrix also provides the relative extrinsics: rotation $R_{AB}$ and up-to-scale (denoting $\propto$) translation $t_{AB}$. The scale $\propto$ can be estimated if a distance between the two cameras is known. Accordingly, the system 170 leverages the additional depth information to guide the camera pose estimation as an additional constraint during optimization.

Given correspondences between two views:

$$\{(p_{i,k}, p_{j,k}) \mid p_{i,k}, p_{j,k} \notin \{\text{mull}\}\}_{k=1}^{K},$$

the control module 220 estimates the essential matrix $E_{ij}$ by minimizing $$\min_E A \cdot v_{ij}^E,$$

where $$v_{ij}^E \in \mathbb{R}^9$$

denotes the flattened 3×3 matrix $E_{ij}$ and A indicates the coefficients for each correspondent equation. The control module 220 can solve the equation linearly using singular value decomposition (SVD). Additionally, to leverage the depth information, the control module 220 formulates the 3D point correspondences with depths as:

$$\{(P_{i,k}, P_{j,k}) \mid P_{i,k}, P_{j,k} \notin \{\text{mull}\}\}_{k=1}^{K}$$

where $P_{i,k} \in \mathbb{R}^{K_d \times 3}$. The 3D points can be null if there are no depths for some joints. If the derived extrinsic from the essential matrix is correct, the rotation matrix $R_{ij}$ and the translation $t_{ij}$ are matched with the rigid transformation $$R'_{ij}, t'_{ij}$$

between $P_{i,k}$ and $P_{j,k}$. While the translation is up-to-scale, the control module 220 applies the angle constraint between rotation matrices and formulates the complete objective to compute the essential matrix as follows.

$$\min_{E,w} A \cdot v_{ij}^{E} + \cos^{-1}\left(\frac{tr\left(R_{ij} \cdot R_{ij}'^{T}\right)}{2} - 0.5\right) - \sum_{s=1}^{J*K} w_s \tag{6}$$

$$\text{s.t. } \left\|v_{ij}^{E}\right\| = 1 \tag{7}$$

$$w_s \in \{0, 1\} \tag{8}$$

$$\text{where } R_{ij} = \text{decomposition of } R \text{ from } E(E)$$

$$R_{ij}'^{T} = VU^T \text{ by } [U, S, T] = SVD\left(\left(P_{i,k} - \text{centroid}_{P_{i,k}}\right)\left(P_{j,k} - \text{centroid}_{P_{j,k}}\right)\right) \tag{9}$$

(multiply $3^{rd}$ column of V by −1 if det(R)<0 where the centroid indicates the mean)

The control module 220 utilizes the maximum number of correct correspondences to solve the objective and compute the essential matrix. By solving the above objective, the control module 220 obtains the camera extrinsics for all pairs of cameras $M_{ij}=[R_{ij}|t_{ij}]$.

To obtain the 3D human poses, as shown in 510 of FIG. 5, the control module 220, in at least one arrangement, performs triangulation on the pairs of 2D point correspondences $$\{(p_{i,k}, p_{j,k})\}_{k=1}^{K}$$

with the computed camera matrices (i.e., the camera poses) determined previously. To filter out the noisy 3D estimates, the control module 220 imposes constraints using the human body prior, such as constant bone length and lift-right symmetry. To mitigate difficulties with triangulation errors due to incorrect cross-view correspondences, the control module 220 leverages the depth information from the 2D correspondences and formulates the 3D point correspondence with depth as $$\left\{\left(P_{i,k}, P'_{j,k}\right)\right\}_{k=1}^{K},$$

where $$P'_{j,k}$$

is the transformed 3D points from $P_{j,k}$ using camera extrinsics $M_{ji}$. The reconstructed 3D joints $$P_k^{(i,j)}$$

are close to both the 3D points $$\left(P_{i,k}, P'_{j,k}\right)$$

if measured depth exists. Since the 3D points generated from depths can also induce additional errors, the control module 220, in one approach, averages the projected 3D depth points that have distances from the triangulated points below a threshold. The depth-constrained triangulation objective implemented by the control module 220 is as follows:

$$\min_{P_{k,d}^{(i,j)}, w_{k,d}} \sum_{d=1}^{D}\left(A \cdot P_{k,d}^{(i,j)} + w_{k,d} \cdot \left\|P_{k,d}^{(i,j)} - P_{k,d}^{depth}\right\|\right) - \sum_{d=1}^{D} w_{k,d} \tag{10}$$

s.t. $w_{k,d} \in \{0,1\}$ (selected depth points and $$w_{k,d} \equiv 0 \text{ if } P_{k,d}^{depth}$$

does not exist)

Where $$P_k^{depth} = \text{mean}\left(\left(P_{i,k}, P'_{j,k}\right)\right)$$

After obtaining all the candidates of the 3D joints using the objective for triangulation, the control module 220 can further apply the 3D pictorial structure prior to selecting the best point or take the average of the joints.

Figure 6:
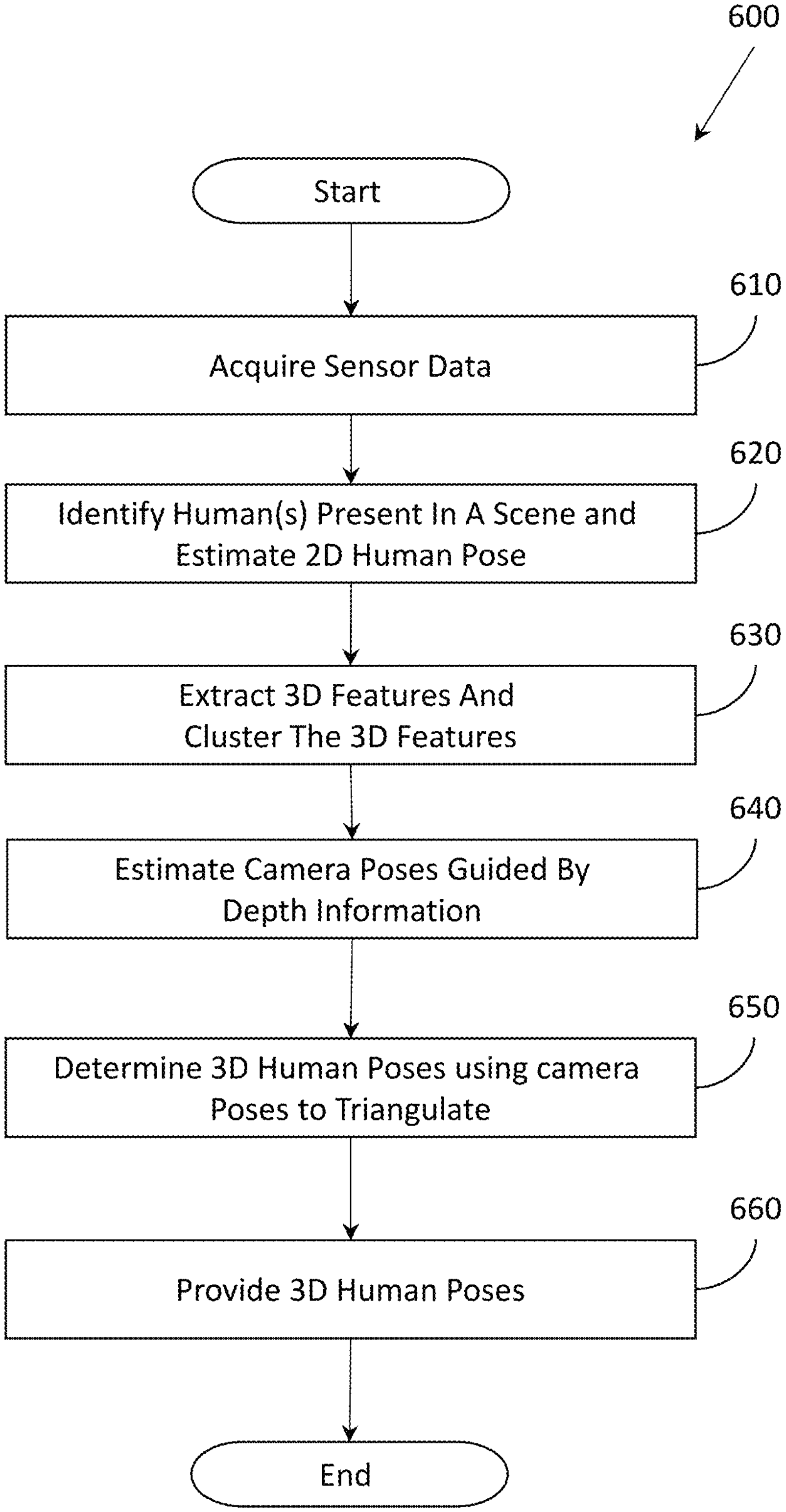
FIG. 6 is a flowchart showing a method associated with using a depth data to improve the determination of human poses.

Additional aspects of improving the determination of 3D poses using depth data will be discussed in relation to FIG. 6. FIG. 6 illustrates a method 600 associated with deriving 3D poses using images from uncalibrated cameras and associated depth information. Method 600 will be discussed from the perspective of the pose system 170 of FIG. 1. While method 600 is discussed in combination with the pose system 170, it should be appreciated that the method 600 is not limited to being implemented within the pose system 170 but is instead one example of a system that may implement the method 600.

At 610, the control module 220 acquires the sensor data 240. In one embodiment, acquiring the sensor data 240 includes controlling one or more sensors of the vehicle 100 to generate observations about the surrounding environment of the vehicle 100. Alternatively, as noted previously, the system 170 may be implemented within an infrastructure device that is statically mounted in the environment. As such, the control module 220 may acquire the sensor data 240 from integrated sensors, such as a camera and a LiDAR. In still further approaches, the module 220 acquires at least a portion of the sensor data 240 from other devices in the environment via wireless communications.

The control module 220, in one or more implementations, iteratively acquires the sensor data 240 from one or more sensors of the sensor system 120. The sensor data 240 includes observations of a surrounding environment of the vehicle 100 or other device. As noted previously, the sensor data 240 includes at least a monocular image and may further include depth data from a LiDAR or another depth sensor.

In any case, the pose system 170 generally acquires both forms of data as input. It should be noted that while the pose system 170 is primarily described as acquiring the image data/depth data via integrated sensors, the system 170 acquires the images from separate cameras that are uncalibrated along with the depth information associated therewith. That is, in general, the images may be acquired from separate entities with no pre-established or known spatial relationship. Thus, the control module 220 may acquire the images from nearby vehicles, infrastructure devices, and so on. Similarly, in each separate instance, the images are associated with depth data derived from the images themselves via monocular depth estimation or from an explicit depth sensor associated with the corresponding camera (e.g., co-located). Whichever sources the system 170 uses to acquire the depth data, the images and depth data are generally of the same scene from different perspectives. Thus, the scene depicted by the sensor data 240 is at least partially overlapping and includes multiple different people present therein.

At 620, the control module 220 determines 2D poses according to the sensor data. In one or more arrangements, the process of determining the 2D poses involves multiple steps and the use of multiple different ones of the models 250. For example, the control module 220 initially processes the sensor data 240 using a detection model that functions to generate bounding boxes for the people depicted in the sensor data 240. The bounding boxes effectively identify coordinates within the images where information about the people is present. The bounding boxes are two-dimensional rectangles or another polygon that delineates an area associated with each separate person.

Generating the bounding boxes helps to focus the subsequent analysis for determining the 2D poses. That is, the control module 220 then analyzes the information within the bounding boxes using a pose model to derive the 2D poses as keypoints associated with different points on the people. For example, the keypoints may be salient points on the people, such as joints, hands, feet, a head, etc. In this way, the pose system 170 is able to generate a focused representation of the people.

Figure 4:
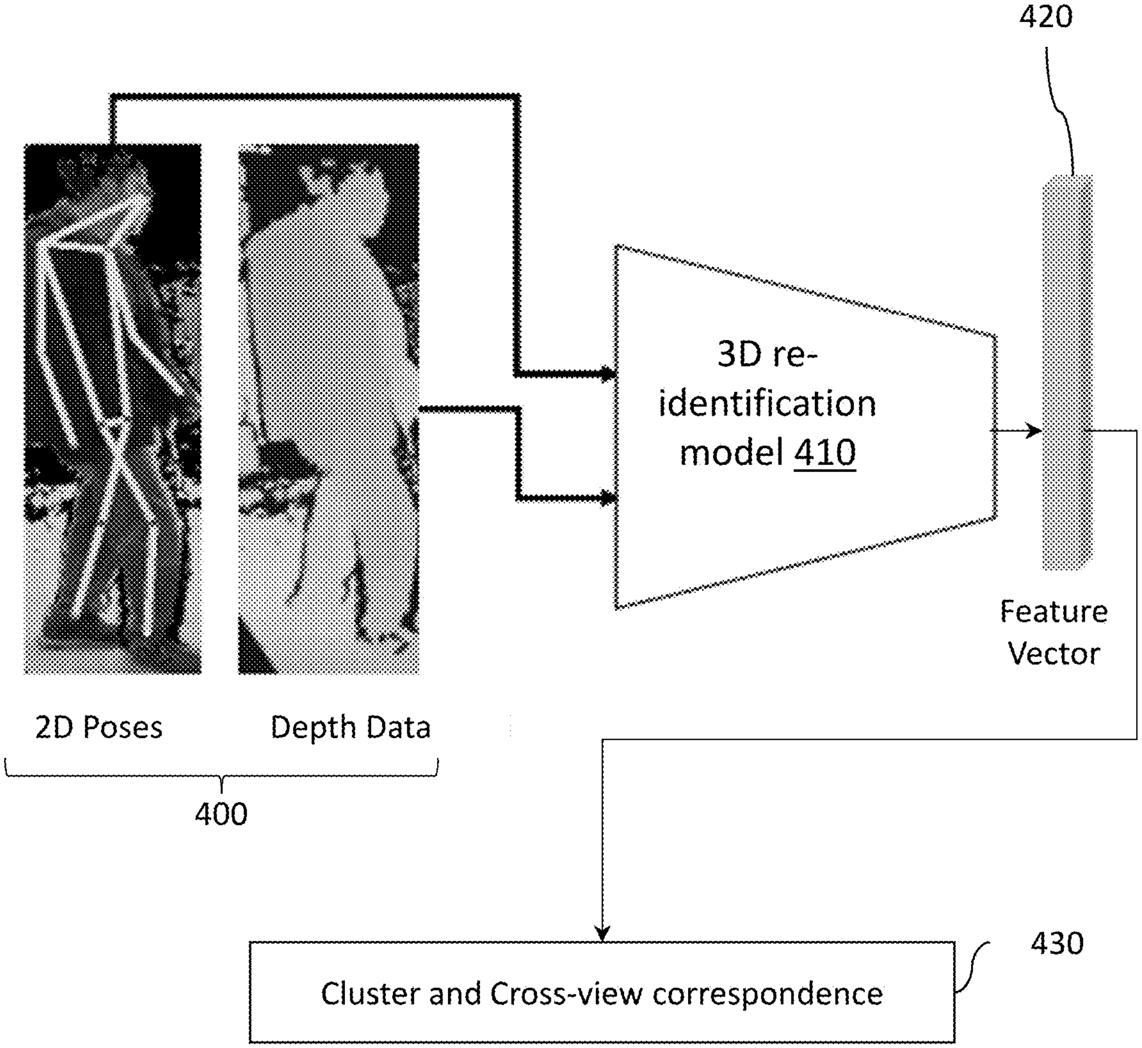
FIG. 4 illustrates a diagram depicting one embodiment a model that performs 3D feature extraction.

At 630, the control module 220 extracts and clusters 3D features of the people previously identified in relation to the 2D poses. In one or more arrangements, the control module 220 analyzes the keypoints within the bounding boxes according to the 2D poses and the depth information using a re-ID model. The re-ID model generates the 3D features, as shown in FIG. 4, as one-dimensional feature vectors. Once the control module 220 generates the 3D features, the control module 220 groups the 3D features according to likely associates with different people using a clustering algorithm. These clusters/groups provide for cross-view correspondence associated with the people depicted in the surrounding environment. That is, the cross-view correspondence correlates information from the separate images/depth data to align with different people represented in the sensor data 240 of the different uncalibrated sensors.

At 640, the control module 220 generates camera poses using at least the depth information and the features for cameras that generated the images. For example, the control module 220 generates the camera poses by applying a 3D point correspondence using the depth information between corresponding keypoints of the 3D features. In this way, the control module 220 can define camera extrinsics that specify transformations between views of the cameras, thereby relating the separate points of view.

At 650, the control module 220 generates 3D poses for the people according to the camera poses and the 3D features. In one arrangement, the control module 220 triangulates 2D point correspondence between the 3D features using the camera poses. That is, the control module 220 uses the computed matrices for the camera extrinsics to perform triangulation on the correspondences between the correlated features while using the depth information as an additional constraint. In this way, the control module 220 derives the 3D poses for uncalibrated cameras in a multi-person context.

At 660, the control module 220 provides the 3D poses. In one arrangement, the control module 220 provides the 3D poses by, for example, communicating the 3D poses to one or more systems within the vehicle 100 to facilitate control of the vehicle 100. That is, the pose system 170 may be integrated with an assistance system 160 that controls the vehicle 100 to perform various actions according to information extrapolated from the 3D poses. In one implementation, the assistance system 160 provides advanced driving assistance to, for example, prevent collisions. Thus, the pose system 170 may provide the 3D poses to facilitate identification of predicted trajectories for the people in the scene from which the system can further perform planning to account for motion of the people. That is, depending on the 3D poses of the people, the system may be able to better predict likely future movements of the people. From the predicted movements/motion, the system can then plan subsequent actions of the vehicle to avoid the people, thereby improving operation of the assistance system 160 and control of the vehicle 100. Of course, while driving assistance is provided as one example, the pose system 170 may be implemented to improve other functions as well, such as semi-autonomous driving, autonomous driving, pedestrian monitoring for intersection safety, and so on.

With reference again to FIG. 1, it should be appreciated that the pose system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. As an additional note, it should be appreciated that, as described previously, the pose system 170 may be implemented within a vehicle or may also be implemented within static infrastructure or as a cloud-based resource. Accordingly, the example of FIG. 1 is illustrative of one approach. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the pose system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 240). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the pose system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the pose system 170, and/or the assistance system 160 may control some or all of these vehicle systems 150 and, thus, may be partially or fully autonomous.

The processor(s) 110, the pose system 170, and/or the assistance system 160 can be operatively connected to communicate with the various vehicle systems 150 and/or individual components thereof. For example, returning to FIG. 1, the processor(s) 110, the pose system 170, and/or the assistance system 160 can be in communication to send and/or receive information from the various vehicle systems 150 to control the movement, speed, maneuvering, heading, direction, etc. of the vehicle 100. The processor(s) 110, the pose system 170, and/or the assistance system 160 may control some or all of these vehicle systems 150.

The processor(s) 110, the pose system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the pose system 170, and/or the assistance system 160 can control the direction and/or speed of the vehicle 100. The processor(s) 110, the pose system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the pose system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the pose system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A pose system, comprising:

one or more processors; and a memory communicably coupled to the one or more processors and storing instructions that, when executed by the one or more processors, cause the one or more processors to:

acquire sensor data from at least cameras that are uncalibrated including images with depth information of a surrounding environment that includes multiple people;

determine 2D poses and 3D features for the people according to the sensor data;

generate camera poses using at least the depth information and the 3D features for cameras that generated the images including instructions to produce an essential matrix defining transformations between each of the cameras;

generate 3D poses for the people according to the camera poses and the 3D features; and provide the 3D poses of the people.

2. The pose system of claim 1, wherein the instructions include instructions to determine the 2D poses including instructions to detect the people from the sensor data using a detection model that generates bounding boxes for respective ones of the people and generates the 2D poses from the bounding boxes using a pose model, and wherein the 2D poses include keypoints associated with different points on the people.

3. The pose system of claim 2, wherein the instructions include instructions to determine the 3D features including instructions to analyze keypoints within the bounding boxes according to the 2D poses and the depth information using a re-ID model, wherein the 3D features are one-dimensional feature vectors, and wherein the instructions include instructions to determine the 3D features including instructions to cluster the 3D features into groups to determine a cross-view correspondence associated with the people depicted in the surrounding environment.

4. The pose system of claim 1, wherein the instructions include instructions to generate the camera poses includes applying a 3D point correspondence using the depth information between corresponding keypoints of the 3D features, and wherein the camera poses define camera extrinsics associated with transformations between views of the cameras.

5. The pose system of claim 1, wherein the instructions include instructions to generate the 3D poses including instructions to triangulate 2D point correspondence between the 3D features using the camera poses.

6. The pose system of claim 1, wherein the instructions include instructions to provide the 3D poses including instructions to project motion of the people using the 3D poses, and plan motion of a vehicle according to the motion.

7. The pose system of claim 6, wherein the vehicle operates at least semi-autonomously.

8. A non-transitory computer-readable medium storing instructions that, when executed by one or more processors, cause the one or more processors to:

acquire sensor data from at least cameras that are uncalibrated including images with depth information of a surrounding environment that includes multiple people;

determine 2D poses and 3D features for the people according to the sensor data;

generate camera poses using at least the depth information and the 3D features for cameras that generated the images including instructions to produce an essential matrix defining transformations between each of the cameras;

generate 3D poses for the people according to the camera poses and the 3D features; and provide the 3D poses of the people.

9. The non-transitory computer-readable medium of claim 8, wherein the instructions include instructions to determine the 2D poses including instructions to detect the people from the sensor data using a detection model that generates bounding boxes for respective ones of the people and generates the 2D poses from the bounding boxes using a pose model, and wherein the 2D poses include keypoints associated with different points on the people.

10. The non-transitory computer-readable medium of claim 9, wherein the instructions include instructions to determine the 3D features including instructions to analyze keypoints within the bounding boxes according to the 2D poses and the depth information using a re-ID model, wherein the 3D features are one-dimensional feature vectors, and wherein the instructions include instructions to determine the 3D features including instructions to cluster the 3D features into groups to determine a cross-view correspondence associated with the people depicted in the surrounding environment.

11. The non-transitory computer-readable medium of claim 8, wherein the instructions include instructions to generate the camera poses includes applying a 3D point correspondence using the depth information between corresponding keypoints of the 3D features, and wherein the camera poses define camera extrinsics associated with transformations between views of the cameras.

12. The non-transitory computer-readable medium of claim 8, wherein the instructions include instructions to generate the 3D poses including instructions to triangulate 2D point correspondence between the 3D features using the camera poses.

13. A method, comprising:

acquiring sensor data including images with depth information of a surrounding environment that includes multiple people, including acquiring the sensor data from sensors, including at least cameras that are uncalibrated;

determining 2D poses and 3D features for the people according to the sensor data;

generating camera poses using at least the depth information and the 3D features for the cameras that generated the images including producing an essential matrix defining transformations between each of the cameras;

generating 3D poses for the people according to the camera poses and the 3D features; and providing the 3D poses of the people.

14. The method of claim 13, wherein determining the 2D poses includes detecting the people from the sensor data using a detection model that generates bounding boxes for respective ones of the people and generating the 2D poses from the bounding boxes using a pose model, wherein the 2D poses include keypoints associated with different points on the people.

15. The method of claim 14, wherein determining the 3D features includes analyzing keypoints within the bounding boxes according to the 2D poses and the depth information using a re-ID model, wherein the 3D features are one-dimensional feature vectors, and wherein determining the 3D features involves clustering the 3D features into groups to determine a cross-view correspondence associated with the people depicted in the surrounding environment.

16. The method of claim 13, wherein generating the camera poses includes applying a 3D point correspondence using the depth information between corresponding keypoints of the 3D features, and wherein the camera poses define camera extrinsics associated with transformations between views of the cameras.

17. The method of claim 13, wherein generating the 3D poses includes triangulating 2D point correspondence between the 3D features using the camera poses.

18. The method of claim 13, wherein providing the 3D poses includes projecting motion of the people using the 3D poses, and planning motion of a vehicle according to the motion.

* * * * *